March 3, 1936.   W. H. ARTHUR   2,032,343
PAPER FOOD CONTAINER
Filed July 16, 1934
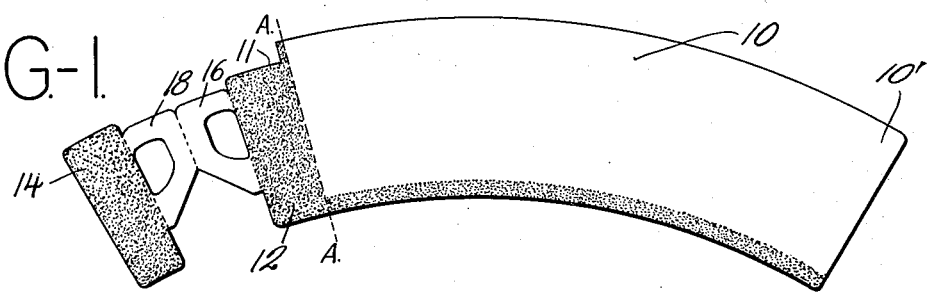
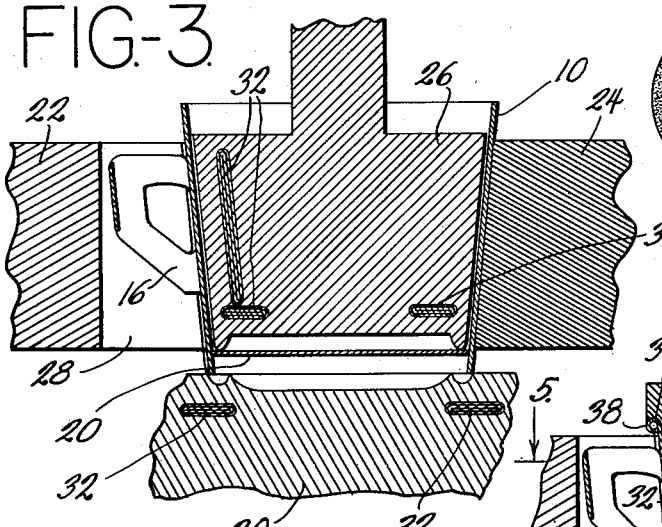
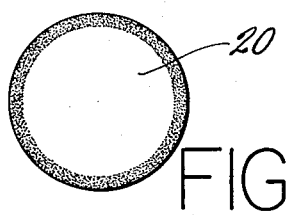
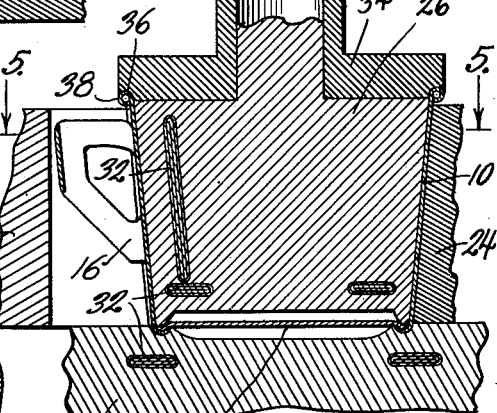
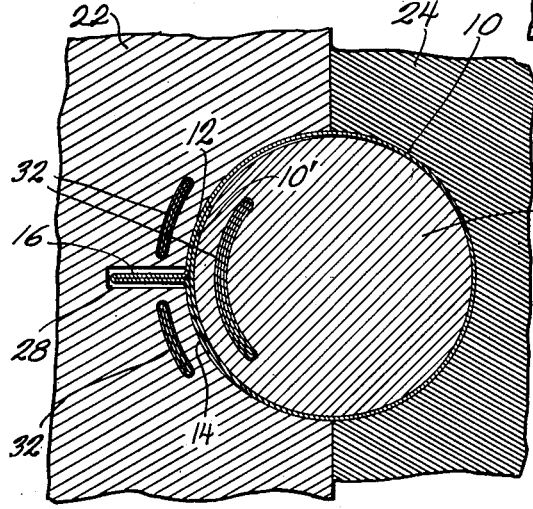
INVENTOR:
William H. Arthur
BY Cox & Moore ATT'YS.

Patented Mar. 3, 1936

2,032,343

UNITED STATES PATENT OFFICE 2,032,343

PAPER FOOD CONTAINER

William H. Arthur, Indianapolis, Ind., assignor to Beach & Arthur, Inc., Indianapolis, Ind., a corporation of Indiana Application July 16, 1934, Serial No. 735,378

18 Claims. (Cl. 93—36)

This invention relates to a method for making paper cups or like food containers and to the articles produced by the method, and more specifically involves the manufacture of paper food receptacles and the like by the use of a thermoplastic cement, adhesive or glue.

It is an object of the invention to provide a new and improved method for manufacturing paper food containers and the like by the use of a ther10 moplastic cement, adhesive or glue.

It is a further object of the invention to provide a method for manufacturing paper cups and the like which may be easily and cheaply performed but which produces an article which is wholly durable and efficient for its intended purpose.

It is a further object of the invention to provide a method for making paper food containers and the like involving the use of a vinyl resin as a thermoplastic adhesive.

It is a further object of the invention to provide a method for making paper food containers and the like which utilizes as an adhesive a thermoplastic which does not discolor the article, which is tasteless and odorless, and which forms an impregnable fluid-tight seal.

It is a further object of the invention to provide a method for making paper food containers and the like which utilizes as an adhesive a ther30 moplastic which is not attacked by ordinary food temperatures and which is not soluble in or attacked by liquids suitable for beverage or food purposes or liquids ordinarily placed within paper containers.

It is a further object to produce a paper food container or the like by the use of heated dies.

It is a further object of the invention to provide a method for making paper containers and the like, which utilizes an adhesive which may be readily applied to all ordinary types of paper and the like, and which is set as an adhesive merely by the application of heat.

It is a further object of the invention to provide a method for making a paper food container or the like which utilizes a thermoplastic adhesive which will not warp the paper on application, in setting, or in the use of the article.

It is a further object of the invention to provide a paper food container or the like, which is se50 cured together by a thermoplastic adhesive.

It is a further object of the invention to provide a paper food container or the like which is secured together by a vinyl resin.

It is a further object of the invention to pro55 vide a paper food container or the like which is secured by an adhesive, which is colorless, tasteless and odorless, which is not attacked by ordinary food temperatures, and which is insoluble in liquids suitable for beverage or food purposes or ordinarily placed within paper containers.

Other objects and advantages of the invention will be apparent from the following description taken in connection with the accompanying drawing, wherein one preferred method of practicing the invention and the article produced thereby are specifically set forth.

Referring to the drawing, in which like reference numerals refer to like parts throughout, Fig. 1 is a view of the side wall piece of a paper cup as it is originally stamped, and showing the thermoplastic adhesive applied thereto.

Fig. 2 shows the bottom piece for the cup.

Fig. 3 is a sectional view showing the cup parts placed within suitable dies by which the parts are shaped and the adhesive secured, the several dies being in generally separated condition.

Fig. 4 is a view similar to Fig. 3 but showing the dies after they have moved to clamping position, and showing also an additional die for forming a bead around the top edge of the cup, and

Fig. 5 is a section taken along the line 5—5 of Fig. 4.

In the drawing, I have shown my invention applied to one preferred arrangement for making a paper cup. It is to be understood, however, that this is only by way of illustration and that the improved method of the invention could be carried out by other equivalent means and steps or applied to the making of cups or other specific shapes and formations or to the making of related types of paper food containers. Also, while paper or card board has been used as the substance for forming the container in the embodiment described, the invention contemplates the use of equivalent materials.

As indicated in Fig. 1, the piece 10 which is to form the side wall of the cup, may be stamped or cut from a single sheet of material into the form shown. The side wall member 10 is generally arcuate in shape and is reduced in height near one end portion, as indicated at 11, forming two sections 12 and 14 of reduced side wall height. The two handle brackets 16 and 18 which are to form the handle, are integrally connected with portions 12 and 14. The material may be impressed along the dotted lines between the two handle brackets and between each handle bracket and its adjacent cup side wall portion, as indicated to facilitate bending of the material.

After the stamping or cutting the wall parts

12 and 14 are coated with a thermoplastic adhesive, a narrow band of the adhesive being also applied to the lower edge of the member 10 throughout its length. Only one side of the member is coated. In applying, the thermoplastic adhesive it is first dissolved in some suitable solvent to render it liquid at ordinary temperatures. It then may be applied with a brush or roller. The solvent evaporates, leaving the thermoplastic adhesive in dry solid form upon the paper.

Fig. 2 shows the circular paper piece 20, which is to form the bottom of the cup. To piece 20 the thermoplastic cement or adhesive is applied in a band of desired width circumferentially around the edge of the piece on one surface, as shown.

One suitable arrangement of dies by which the cup parts may be formed and secured together into the completed article is shown in Figs. 3, 4, and 5. Die members 22 and 24 have mating conical surfaces therein, as indicated in Fig. 5, forming when together, a substantially continuous conical surface for cooperation with the conical die 26. Die member 22 has a vertical slit 28 extending throughout its entire height for the reception of the handle parts of side wall cup piece 10. Arranged beneath the die members 22, 24, and 26 is a bottom forming die member 30, which is normally in the position shown in Fig. 3.

In forming the cup after the thermoplastic is dry, the handle brackets 16 and 18 of the side wall member 10 are first folded upon themselves to bring the adhesive covered surfaces of parts 12 and 14 together. The parts 12 and 14 may then be opened or reversely bent with respect to the handle brackets so that they again lie in their original coplanar arrangement. However, they are now juxtaposed, and the handle parts extend perpendicularly thereto. The piece 10 is now formed into generally circular shape with the adhesive covered surface inwardly and inserted between die members 22 and 24, the handle parts 16 and 18 being inserted into slit 28 in die member 22. At this time conical die 26 is in raised position entirely clear of die members 22 and 24 so as not to interfere with the insertion of blank 10. The edges of the blank are brought to rest upon lower die 30 which determines the vertical position which the blank will assume. The inherent resiliency of blank 10 will hold it outwardly against the conical surfaces of dies 22 and 24. The size of the parts is adjusted so that the end portion 10' of the blank 10 will overlap the adhesive carrying parts 12 and 14, as indicated in Fig. 5, to substantially the line A—A of Fig. 1 when the die members 22 and 24 are brought together. Bottom blank member 20 is now dropped into the circularly arranged side blank with its adhesive carrying surface facing downwardly. Die member 26 is then moved downwardly to the position shown in Fig. 3, aligning the bottom blank after which the die members 22 and 24 are brought toward each other and tightly into engagement with the die 26, as shown in Figs. 4 and 5. The lower die member 30 is then raised from its Fig. 3 to its Fig. 4 position, and during the lifting operation the bottom edge of the side wall blank 10 is formed around the edges of the bottom blank 20, as indicated in Fig. 4.

The die members 22, 26, and 30 carry imbedded therein electric heating coils 32, by which the several dies may be heated, particularly adjacent the thermoplastic. As the dies are heated, the dry thermoplastic adhesive becomes plastic and penetrates into the paper, and all contacting layers of thermoplastic are thoroughly commingled, thereby forming an impregnable bond between the paper surfaces wherever the thermoplastic is present. The temperature to which the dies are heated is such that the thermoplastic is heated sufficiently to impregnate the paper and unite with itself to form a firm bond, but not sufficiently to decompose the thermoplastic or otherwise impair its efficiency. The pressure of the various dies against the paper aids in the impregnating and sealing action.

During the heating operation a die 34 having a suitably formed semi-circular groove 36 running around the periphery of its lower face is lowered into engagement with the top edge of the side walls 10, and forms thereon an annular bead 38 circumferentially of the top edge of the cup. After sufficient heating and pressure have been applied, the dies are separated and the thermoplastic is allowed to cool, thereby forming the completed cup, the parts of which are firmly and efficiently sealed.

The heating of the dies improves the shaping of the article in that the heat sets the blanks in their completed form in a manner which cannot be accomplished by the use of pressure alone.

I have discovered that vinyl resins make very efficient thermoplastic adhesives as applied to the manufacture of paper food containers. I accordingly prefer to use a vinyl resin as the thermoplastic adhesive in the above-described method. The vinyl resin may be prepared by polymerizing vinyl acetate, the polymerization process being brought about by heat and sunlight. Also, the polymerization may be accelerated by suitable catalytic agents so that it takes place within a shorter time interval. Instead of polymerizing vinyl acetate alone to form the vinyl resin, the resin may be polymerized from a mixture of vinyl acetate and vinyl chloride. The addition of the chloride makes the vinyl resin tougher and harder. In such case the vinyl resin includes both the acetate and the chloride. A suitable vinyl resin for use as a thermoplastic adhesive in the above-described process is that commercially known and sold as Vinylite.

The vinyl resin or Vinylite is at ordinary temperatures and pressures a clear, hard, colorless, and crystalline substance. In using it as the thermoplastic adhesive it is first dissolved to put it in liquid solution. The various ketones are suitable solvents for Vinylite and of these I prefer to use acetone, as it is the most commercially available. However, other solvents which might be used are the higher ketones such as methyl-ethyl-ketone, methyl-propyl-ketone, methyl-butyl-ketone and the like. After the Vinylite has been put in the form of a liquid solution it is applied by brush or roller to the blanks which are to form the cup or other paper food container, as previously described. The solvent quickly evaporates, leaving the thermoplastic vinyl resin on the blanks in solid form. The evaporation of the solvent may be accelerated by blowing air upon the applied thermoplastic. After drying the blanks are placed in operative relation to the dies, and heat and pressure are applied, as described. In the use of Vinylite or vinyl resins, a temperature of approximately 300 degrees Fahrenheit has been found suitable for obtaining a satisfactory adhesion of the material. At this temperature the Vinylite impregnates the paper, forming a firm bond therewith, and also the various layers of the superimposed vinyl resin commingle to form a substantially integral fluid-tight body. Upon cooling the Vinylite sets into a particularly satisfactory adhesive material which is colorless and hence does not impart any color to the paper, and which is tasteless and odorless. Also, Vinylite is not rendered plastic at temperature of ordinary heated liquid foods, and Vinylite and vinyl resins are insoluble in alcohols, water, caustics, ordinary mineral acids, hydrocarbon solvents, ammonia and all liquids suitable for food consumption. These are desirable properties in a paper food container adhesive.

While a vinyl resin such as Vinylite is the thermoplastic adhesive which I prefer to use in my process, reasonably satisfactory results may be obtained by use of certain other thermoplastics which will act as adhesives such as glyptal alkyds resins, acrolein resin, styrols meta and poly plastics, urea resins, resinoids, plastics-resins, and cellulose plastics, such as cellulose acetate.

It will be seen that the manufacture of paper food containers by the use of a thermoplastic adhesive embodies a number of advantages over manufacture with the use of ordinary adhesives, and the product formed is superior in a number of particulars. Thus in the manufacturing process, the thermoplastic adhesive may be applied in solution form by suitable roller or brush, at which time it is easily handled. After drying of the thermoplastic, the blanks which are to form the completed article may be conveniently handled, and readily packaged or shipped to other manufacturing plants; and during this time the thermoplastic is hard and dry and not sticky so as to interfere with handling. The completed article may be formed by the use of suitable dies in connection with pressure and heat, no moisture being required. The completed article formed is not sticky and will not become so in ordinary use.

In the use of a vinyl resin such as Vinylite as the thermoplastic adhesive, particular advantages are secured. Thus the solvent used for dissolving the Vinylite is readily evaporated and the Vinylite thus rapidly dried after application in the liquid form. Its specific gravity is such that it is suitable for use with paper of any weight. In applying Vinylite to the paper, the latter is not warped or wrought out of shape, nor will Vinylite during the subsequent heating operations or in use, pull the paper out of shape. Vinylite, upon being heated to the proper adhesion temperature, impregnates the paper and unites with itself to form an integral body, which forms a very satisfactory fluid-tight seal. Vinylite is clear and colorless, tasteless and odorless, is not rendered plastic at ordinary hot liquid temperatures, and is insoluble in practically all liquids, particularly those which are ordinarily placed within paper containers or those suitable for food or drink.

It is obvious that various changes may be made in the specific embodiments of my invention, which I have used for illustrative purposes, and I therefore do not wish to be limited to the precise constructions or method steps shown and described, but only as indicated in the following claims, for the invention contemplates the use of equivalents throughout.

I claim:

1. The method of making a container body for beverages which includes the securing of the parts of the container together in liquid-tight joints with a thermoplastic adhesive, said adhesive being crystal clear and unaffected by hot liquids.

2. The method of making a paper food container which includes the step of securing the parts of the container together with a vinyl resin which is non-alcohol soluble and which is both tasteless and odorless.

3. The method of making a paper food container which includes the step of securing the parts of the container together with a non-alcohol soluble polymerized vinyl acetate.

4. The method of making a food container which comprises applying a non-alcohol soluble vinyl resin to the blanks which are to form the container, shaping the blanks into container forming position, and applying heat and pressure to the blanks and the vinyl resin thereon to secure parts of the blanks together.

5. The method of making a food container which comprises applying a non-alcohol soluble polymerized vinyl acetate to the blanks which are to form the container, shaping the blanks into container forming position, and applying heat and pressure to the blanks and the polymerized vinyl acetate thereon to secure parts of the blanks together.

6. The method of making a paper food container which comprises putting a crystal clear thermoplastic adhesive in liquid form by dissolving it in a solvent, applying the liquid thermoplastic to parts of the paper blanks which are to form the completed container, evaporating the solvent to dry the thermoplastic, shaping the blanks into container form with parts to be secured together in contact, and applying heat to the thermoplastic to render it plastic and adhesive, and cooling the thermoplastic.

7. The method of making a paper food container which comprises putting a crystal clear vinyl resin in liquid form by dissolving it in a solvent, applying the liquid vinyl resin to parts of the paper blanks which are to form the completed container, evaporating the solvent to dry the vinyl resin, shaping the blanks into container form with parts to be secured together in contact, and applying heat to the vinyl resin to render it plastic and adhesive, and cooling the vinyl resin.

8. The method of making a paper food container which comprises putting a non-alcohol soluble vinyl resin in liquid form by dissolving it in a ketone, applying the liquid vinyl resin to parts of the paper blanks which are to form the completed container, evaporating the ketone to dry the vinyl resin, shaping the blanks into container form with parts to be secured together in contact, and applying heat to the vinyl resin to render it plastic and adhesive, and cooling the vinyl resin.

9. The method of securing together parts of a paper food container which comprises putting a crystal clear vinyl resin in liquid form by dissolving it in a solvent, applying the vinyl resin in liquid form to one paper part, evaporating the solvent to render the vinyl resin dry, superimposing on said paper part another paper part having a similar dried vinyl resin thereon with the vinyl resin surfaces in contact, applying heat to said parts to render the vinyl resins plastic so that they penetrate the paper and co-mingle with each other to form a fluid-tight seal.

10. The method of making a paper food container which comprises putting a non-alcohol soluble vinyl resin in liquid form by dissolving it in a solvent, applying the liquid vinyl resin to parts of the blanks which are to be secured together to form the container, evaporating the solvent, shaping the blanks into container form, and heating the blanks to more than 200 degrees F. to render the vinyl resin plastic and adhesive, and cooling the vinyl resin.

11. A paper food container, a part of which is secured in position by a crystal clear vinyl resin.

12. A multiple part paper food container, the parts of which are secured together by a non-alcohol soluble polymerized vinyl acetate.

13. A paper cup for liquid foods and beverages having its side walls secured together, and its bottom secured to the side walls by means of a non-alcohol soluble vinyl resin.

14. A multiple part paper food container, parts of which are secured together by a thermoplastic adhesive which is crystal clear and unaffected by hot foods.

15. The method of making a paper food container which comprises applying a thermoplastic which is tasteless and unaffected by hot foods to the blanks, which are to form the container, shaping the blanks into container-forming position, and applying heat and pressure to the blanks and the thermoplastic thereon to secure parts of the blanks together.

16. The method of making a paper food container which comprises putting a tasteless thermoplastic adhesive into liquid form by dissolving it in a solvent, applying the thermoplastic in liquid form to the blanks which are to form the container, evaporating the solvent to render the thermoplastic adhesive dry, shaping the blank into container form, and applying heat and pressure to said blanks by means of these members.

17. The method of making a paper food container which comprises applying a thermoplastic adhesive which is tasteless and odorless and unaffected by hot foods to a part of a paper container blank while in liquid form, and drying the thermoplastic thereon.

18. A liquid-tight food container, a body part of which is secured in position by a non-alcohol soluble colorless thermoplastic adhesive which is unaffected by hot liquids.

WILLIAM H. ARTHUR.